(12) United States Patent
Worley et al.

(10) Patent No.: US 11,257,034 B1
(45) Date of Patent: Feb. 22, 2022

(54) WEIGHT BASED ITEM MOVEMENT MONITORING

(71) Applicant: Amazon Technologies, Inc., Seattle, WA (US)

(72) Inventors: Spencer Worley, Camano Island, WA (US); Alexander Michael McNamara, Seattle, WA (US); Natalie Thuy-Tien Nguyen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 16/882,161

(22) Filed: May 22, 2020

Related U.S. Application Data

(62) Division of application No. 14/033,267, filed on Sep. 20, 2013, now Pat. No. 10,664,795.

(51) Int. Cl.
*G06Q 10/08* (2012.01)
(52) U.S. Cl.
CPC .................. *G06Q 10/087* (2013.01)
(58) Field of Classification Search
CPC .............................................. G06Q 10/087
See application file for complete search history.

(56) References Cited

U.S. PATENT DOCUMENTS

| | | | |
|---|---|---|---|
| 5,930,771 A | 7/1999 | Stapp | |
| 6,041,274 A | 3/2000 | Onishi et al. | |
| 6,462,663 B1 | 10/2002 | Wilson et al. | |
| 6,796,799 B1 | 9/2004 | Yoshiike et al. | |
| 7,092,789 B2 | 8/2006 | Chavez et al. | |
| 7,180,014 B2 * | 2/2007 | Farber | G16H 40/20 177/25.19 |
| 7,225,980 B2 | 6/2007 | Ku et al. | |

(Continued)

FOREIGN PATENT DOCUMENTS

| CN | 201965010 U | 9/2011 |
|---|---|---|
| CN | 202052709 U | 11/2011 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Ramsey Refai
(74) *Attorney, Agent, or Firm* — Athorus, PLLC

(57) ABSTRACT

This disclosure describes a system for managing inventory as it transitions into a materials handling facility, as it transitions between locations within a materials handling facility and/or as it transitions out of a materials handling facility. In some instances, a total weight associated with a user pattern may be monitored by sensors of a base surface and weight of inventory items may be monitored by sensors at the inventory locations. When a user associated with the user pattern retrieves an item from an inventory location, the decrease in the weight at the inventory location will correspond with the increase in total weight associated with the user pattern. Accordingly, the item may be tracked from the inventory location and associated with the user pattern based on the corresponding changes in weight.

20 Claims, 10 Drawing Sheets

(56) References Cited

U.S. PATENT DOCUMENTS

| | | |
|---|---|---|
| 7,416,117 B1 | 8/2008 | Morrison |
| 7,774,243 B1 | 8/2010 | Antony |
| 7,949,568 B2 | 5/2011 | Fano et al. |
| 8,009,864 B2 | 8/2011 | Linaker et al. |
| 8,091,782 B2 | 1/2012 | Cato et al. |
| 8,175,925 B1 | 5/2012 | Rouaix |
| 8,189,855 B2 | 5/2012 | Opalach et al. |
| 8,380,347 B2 | 2/2013 | Garson et al. |
| 8,423,431 B1 | 4/2013 | Rouaix et al. |
| 8,630,924 B2 | 1/2014 | Groenevelt et al. |
| 8,680,991 B2 | 3/2014 | Tran |
| 8,688,598 B1 | 4/2014 | Shakes et al. |
| 9,158,115 B1 | 10/2015 | Worley et al. |
| 9,165,318 B1 | 10/2015 | Pauley et al. |
| 9,216,857 B1 | 12/2015 | Kalyan et al. |
| 9,311,789 B1 | 4/2016 | Gwin |
| 9,473,747 B2 | 10/2016 | Kobres et al. |
| 2003/0002712 A1 | 1/2003 | Steenburgh et al. |
| 2003/0154141 A1 | 8/2003 | Capazario et al. |
| 2004/0181467 A1 | 9/2004 | Raiyani et al. |
| 2005/0027603 A1 | 2/2005 | Green |
| 2005/0067816 A1 | 3/2005 | Buckman |
| 2005/0077352 A1 | 4/2005 | Gudbjartsson |
| 2005/0171854 A1 | 8/2005 | Lyon |
| 2006/0001545 A1 | 1/2006 | Wolf |
| 2006/0139166 A1 | 6/2006 | Choutier et al. |
| 2006/0195050 A1 | 8/2006 | Alwan et al. |
| 2006/0259195 A1 | 11/2006 | Eliuk et al. |
| 2007/0276270 A1 | 11/2007 | Tran |
| 2008/0018738 A1 | 1/2008 | Lipton et al. |
| 2008/0055087 A1 | 3/2008 | Horii et al. |
| 2008/0077511 A1 | 3/2008 | Zimmerman |
| 2008/0103939 A1 | 5/2008 | Gibb |
| 2008/0106870 A1 | 5/2008 | Dully |
| 2008/0109114 A1 | 5/2008 | Orita et al. |
| 2008/0129518 A1 | 6/2008 | Carlton-Foss |
| 2008/0186189 A1 | 8/2008 | Azzaro et al. |
| 2009/0072029 A1 | 3/2009 | Martin |
| 2009/0121017 A1 | 5/2009 | Cato et al. |
| 2009/0179734 A1 | 7/2009 | Do et al. |
| 2009/0224925 A1 | 9/2009 | Gannot et al. |
| 2009/0245573 A1 | 10/2009 | Saptharishi et al. |
| 2009/0254003 A1 | 10/2009 | Buckman |
| 2009/0259571 A1 | 10/2009 | Ebling et al. |
| 2009/0287449 A1 | 11/2009 | Nagashima |
| 2009/0322540 A1 | 12/2009 | Richardson et al. |
| 2009/0322548 A1 | 12/2009 | Gottlieb |
| 2010/0172052 A1 | 7/2010 | Shibata |
| 2011/0011936 A1 | 1/2011 | Morandi et al. |
| 2011/0178863 A1 | 7/2011 | Daigle |
| 2011/0230791 A1 | 9/2011 | Kate et al. |
| 2011/0295412 A1 | 12/2011 | Hara et al. |
| 2012/0019643 A1 | 1/2012 | Gideon et al. |
| 2012/0101770 A1 | 4/2012 | Grabiner et al. |
| 2012/0123277 A1 | 5/2012 | Blaha et al. |
| 2012/0235860 A1 | 9/2012 | Ghazarian |
| 2012/0262294 A1 | 10/2012 | Nikolovski |
| 2012/0284132 A1 | 11/2012 | Kim et al. |
| 2012/0314901 A1 | 12/2012 | Hanson et al. |
| 2013/0000228 A1 | 1/2013 | Ovaert |
| 2013/0076898 A1 | 3/2013 | Philippe et al. |
| 2013/0100284 A1 | 4/2013 | Fujii et al. |
| 2013/0138395 A1 | 5/2013 | Baggen et al. |
| 2013/0217352 A1 | 8/2013 | Pan et al. |
| 2013/0223673 A1 | 8/2013 | Davis et al. |
| 2013/0253700 A1 | 9/2013 | Carson et al. |
| 2013/0285813 A1 | 10/2013 | Kasama |
| 2014/0031972 A1 | 1/2014 | DeWitt et al. |
| 2014/0104059 A1 | 4/2014 | Tran |
| 2014/0191863 A1 | 7/2014 | Kate |
| 2014/0201042 A1 | 7/2014 | Meyer |
| 2014/0229343 A1* | 8/2014 | Higgins ............... G07G 1/0072 705/28 |
| 2014/0266684 A1 | 9/2014 | Poder et al. |
| 2014/0276242 A1 | 9/2014 | Chen et al. |
| 2014/0279294 A1 | 9/2014 | Field-Darragh et al. |
| 2014/0288714 A1 | 9/2014 | Poivet |
| 2014/0304072 A1 | 10/2014 | Rider et al. |
| 2014/0313036 A1 | 10/2014 | Sweeney et al. |
| 2014/0362223 A1 | 12/2014 | LaCroix et al. |
| 2015/0002292 A1 | 1/2015 | Cavalcanti et al. |
| 2015/0006319 A1 | 1/2015 | Thomas et al. |
| 2015/0019391 A1 | 1/2015 | Kumar et al. |
| 2015/0033246 A1 | 1/2015 | Gideon et al. |
| 2015/0068069 A1 | 3/2015 | Tran et al. |
| 2015/0073907 A1 | 3/2015 | Purves et al. |
| 2015/0302720 A1 | 10/2015 | Zhang et al. |
| 2015/0317890 A1 | 11/2015 | Kate |
| 2016/0028825 A1 | 1/2016 | Corbin |
| 2016/0038061 A1 | 2/2016 | Kechichian et al. |
| 2016/0113551 A1 | 4/2016 | Annegarn et al. |

FOREIGN PATENT DOCUMENTS

| | | |
|---|---|---|
| CN | 102328870 A | 1/2012 |
| CN | 203015121 U | 6/2013 |
| DE | 1616196 A1 | 3/1971 |
| EP | 1616196 A2 | 1/2006 |
| JP | 2004001907 A | 1/2004 |
| JP | 2006228024 A | 8/2006 |
| JP | 2011156099 A | 8/2011 |
| KR | 101228300 B1 | 2/2013 |
| WO | 2004092744 A2 | 10/2004 |
| WO | 2011124732 A2 | 10/2011 |
| WO | 2015028283 A1 | 3/2015 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Estudillo-Valerrama et al., "Design and Implementation of Distributed Fall Detection System—Personal Server", Nov. 2009, IEEE Transactions on Information Technology in Biomedicine, vol. 13 No. 6, pp. 874-881.

* cited by examiner

WEIGHT BASED ITEM MOVEMENT MONITORING

PRIORITY

This application is a divisional of U.S. patent application Ser. No. 14/033,267, filed Sep. 20, 2013, and titled "Weight Based Item Tracking," the contents of which are herein incorporated by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, for an item to be moved from one location to another, it is picked from its current location and transitioned to a new location. It is often desirable to track the transition of inventory and/or the location of inventory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
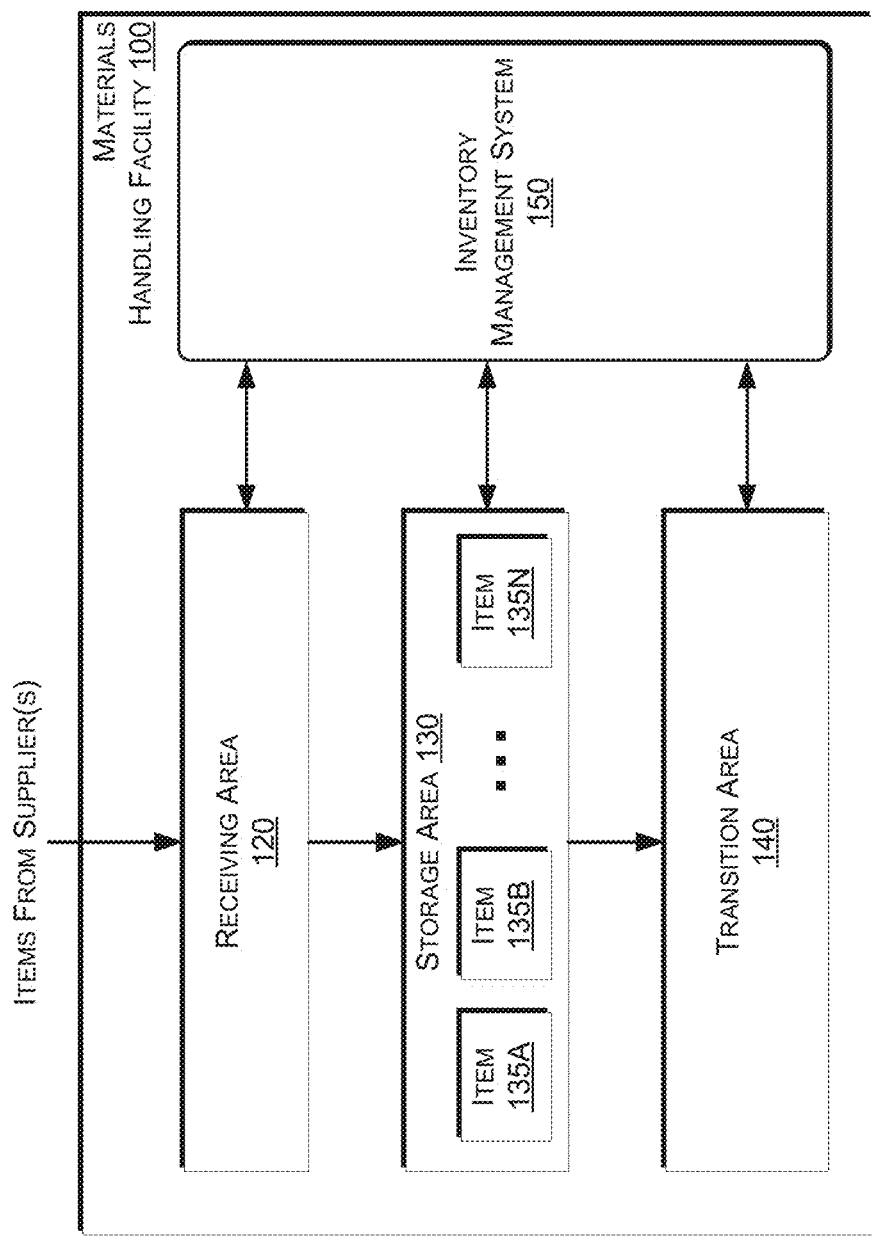
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for tracking movement of users within a materials handling facility and for managing inventory as it transitions into a materials handling facility, as it transitions between locations within a materials handling facility and/or as it transitions out of a materials handling facility. In some instances, a user (e.g., picking agent, stowing agent) may retrieve an item from an inventory location and place the item into a tote. The systems described herein detect the movement and location of the user as well as the transition of the item from the inventory location, to the user and into the tote. Likewise, when an item is placed at an inventory location, the source of that item is determined and the transition from the source to the inventory location is determined.

In some implementations, all or a portion of a base surface (e.g., floor) of a materials handling facility may include sensors configured to detect contacts between objects (e.g., user's feet, wheels of totes) and the base surface. In some implementations, the sensors can be used to determine the size and/or shape of the contacts between the base surface and a portion of an object as well as the force (weight) being applied to the base surface at each contact.

Information about each contact may be included in a user pattern. A user pattern may include an identification of the size and shape of a contact between an object (e.g., a user's shoe, a wheel of a tote) and the base surface, a total weight for all objects (e.g., user(s), companion(s) with the user, item(s), tote(s)) associated with the user pattern, etc. The total weight associated with the user pattern may include the weight of the user, the tote, picked items, and/or any companions with the user. The tote 202 may also be associated with the user pattern. The user pattern may also include and/or be associated with an item identifier list that is updated each time a user and/or companion with the user removes an item from an inventory location (item identifier list is updated to include the item identifier) or places an item at an inventory location (item identifier list is updated to remove the item identifier).

The user pattern may be used to monitor the position and movement of a user as they progress through the materials handling facility. For example, if the user is standing on two feet, the size and shape of each foot (or shoe) of the user may be determined and the total weight of the user computed based on the sum of the weight measured at each contact between the user and the base surface. If the user is using a tote, the size and shape of each contact between the tote and the base surface may be included in the user pattern. Likewise, the total weight associated with the user pattern may be the sum of the weight measured at each contact between the base surface and an object associated with the user pattern (e.g., the two user contacts and the four tote contacts).

As the user begins to walk, the weight measured by the base surface at each of the two user contacts will change until one of the user contacts separates from the floor. Once separated, the user weight will be on one user contact. An estimated next contact can be determined based on an approximate step distance, gait and/or cadence of the user and a direction and/or distance in which the tote contacts have moved. As the user's foot returns to the floor the contact is detected, the increase in weight at the new contact measured, the decrease in weight at the other contacts measured and a confirmation is made that the magnitude of the increase in weight and the magnitude of the decrease in weight are approximately equal. As discussed further below, additional measured weight resulting from the movement or momentum of the user may be determined and removed from the total weight. For example, if the user is walking forward, the momentum, which can be determined from the formula $p=m*v$ (p: momentum; m: mass: v: velocity) can be determined and removed from the measured weight at the time the contact occurs with the base surface. If the magnitude of the two measurements are equal and/or the size or shape of the new contact matches the size and shape of contacts associated with the user pattern, the location of the user associated with the user pattern is updated. This process may continue as the user progresses through the materials handling facility.

In some implementations, the base surface sensors and the corresponding measured weight may be used to determine if a user has removed an item from an inventory location or placed an item at an inventory location. For example, if a user removes an item from an inventory location, the total weight associated with the user pattern increases by an amount equal to the weight of the item removed from the inventory location. In a similar manner, if a user places an item at an inventory location, the total weight associated with the user pattern may decrease by an amount equal to the weight of the placed item. In either case, the total weight associated with the user pattern may be updated and an item identifier either added to or removed from the item identifier list associated with the user pattern. The item identifier list identifies each item that has been removed from an inventory location and associated with the user pattern (e.g., in the possession of the user, stored in the user's tote, consumed by the user).

In some implementations, the tote may include sensors that detect weight of items added to and/or removed from the tote. For example, if the user removes an item from an inventory location and places the item in the tote, the weight of the item in the tote may be detected and compared with the decrease in weight at the inventory location. If the magnitude of the increase in tote weight equals the magnitude of the decrease in inventory location weight, the item can be identified and added to the item identifier list associated with the user pattern.

When the user pattern reaches a transition area, such as a pack station, another inventory location, shipping, exit, etc. the items on the item identifier list may be used to transition the inventory to a new location. For example, if the items identified on the item identifier list are exiting the materials handling facility to be shipped by a carrier to a customer, the transition area may be the area from which the items exit the materials handling facility—such as a loading door where the items are transitioned to the carrier's truck or other transportation unit. When the user associated with the user pattern reaches the transition area, the item identifier list is retrieved, an expected weight of the objects (e.g., items, user and/or tote) associated with the user pattern is computed and compared to the actual total weight of the objects associated with the user pattern. In some implementations, the user may remain stationary for a brief period of time so the total weight of the objects associated with the user pattern can be determined independent of any other forces (e.g., momentum). Any differences between the expected weight and the actual total weight may be resolved by a user (e.g., picking agent, packer, customer, carrier) at the transition area through confirmation of the items in the user's possession and/or identification of other changes that have resulted in the weight difference. For example, the user may interact with a display at the transition area to confirm and/or change the identity of the items included on the item identifier list associated with the user pattern.

Once any differences have been resolved, the items are transitioned. For example, if the items are exiting the materials handling facility, they may be transitioned from the materials handling facility to the entity that is taking them from the materials handling facility. Continuing with the above example of a carrier taking the items from a materials handling facility for shipment to a customer, the items may be transitioned from the materials handling facility to the carrier. As another example, if the transition area is a pack station within the materials handling facility, the items may be transitioned from the original storage location (or the tote) to the pack station. As still another example, if the materials handling facility is a retail location and the user is purchasing items, when the user leaves the retail location the items may be transitioned from the materials handling facility to the user and the user may be charged for the items. In a similar manner, if the materials handling facility is a rental location, or a library, the transition area may be near the exit of the facility. When the user leaves with items, the items are transitioned from the materials handling facility to the user that is taking the items. In such a case, a rental or borrow time may be associated with the items and the user, identifying by when the items are to be returned.

In some implementations, the user pattern and associated information may be utilized to provide assistance to the user. For example, if a contact associated with the user pattern changes to one large contact on the base surface and/or if the weight suddenly increases due to a large object contacting the floor at a high velocity, it may be determined that the user has fallen and needs assistance. Likewise, if the weight associated with certain contacts (e.g., user's feet) shift heavily to other contacts (e.g., tote) it may be determined that the user is tired and assistance may be given directing the user to a rest area, chair, etc.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130 and transition area 140. Any one or more of the receiving area 120, storage area 130 and/or transition area 140 may include sensors on base surfaces configured to detect contacts between the base surface and objects associated with user patterns and weights of objects. Likewise, in some implementations, one or more portions of the receiving area 120, storage area 130 or transition area 140 may include inventory locations configured with sensors capable of detecting weight of objects on or in the inventory location. For example, if the inventory location is a shelf, the shelf may include one or more sensors configured to detect the presence and/or weight of objects located on the shelf. Sensors located at the base surface and/or at the inventory locations may be any one or combination of sensors. For example, the sensors may include weight sensors, pressure sensors, and/or Interpolating Force-Sensitive Resistance ("IFSR") sensors.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, weight or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms (generally referred to herein as "inventory locations"), such that all items 135 of a given kind are stored in one inventory location. In other implementations, like items 135 may be stored in different inventory locations. For example, to optimize retrieval of certain items 135 having high turnover within a large physical facility, those items 135 may be stored in several different inventory locations to reduce congestion that might occur at a single point of storage.

When a customer order specifying one or more items 135 is received, or as a user progresses through the materials handling facility 100, the corresponding items 135 may be selected or "picked" from inventory locations. In various implementations, item picking may range from manual to completely automated picking. For example, in one implementation, a user may have a list of items they desire and may progress through the materials handling facility picking items 135 from inventory locations within the storage area 130 and placing those items 135 into a tote. In other implementations, materials handling facility employees may pick items 135 using written or electronic pick lists derived from customer orders and place picked items into a tote as the materials handling facility agent progresses through the materials handling facility 100.

As discussed in more detail below, as items are picked the total weight associated with a user pattern may increase in the amount of the picked item. Likewise, the inventory location weight will decrease as a result of the item removal. These changes in weight can be compared to confirm with which user pattern the item is to be associated as well as to confirm the identity of the picked item. For example, even if there are multiple users at or near the inventory location and an item action of item removal is detected at the inventory location, the user pattern with the increased total weight can be determined and the identifier for the removed item can be associated with that user pattern. After items 135 have been picked and associated with a user pattern, they, may be processed at transition area 140. A transition area may be any designated area within a materials handling facility where items associated with a user pattern are transitioned from one location to another, or from one entity to another. For example, the transition area may be a packing station within the materials handling facility and when the user pattern arrives at the packing station (transition area) the items may be transitioned from the storage area 130 to the packing station, or from the user to the storage area 130. Similar to picking, the storage area 130 may include sensors and the increase in weight at the storage area may be measured and compared to a decrease in weight of the total weight associated with the user pattern. Such information may be maintained by the inventory management system 150 to enable accurate tracking of items.

In another example, if the items are departing the materials handling facility (e.g., a carrier is taking the items for transport, a customer is purchasing or renting the items), when the user pattern reaches the transition area, the item identifier list is obtained and the items are transitioned from the materials handling facility to the new entity (e.g., carrier, customer).

Figure 2:
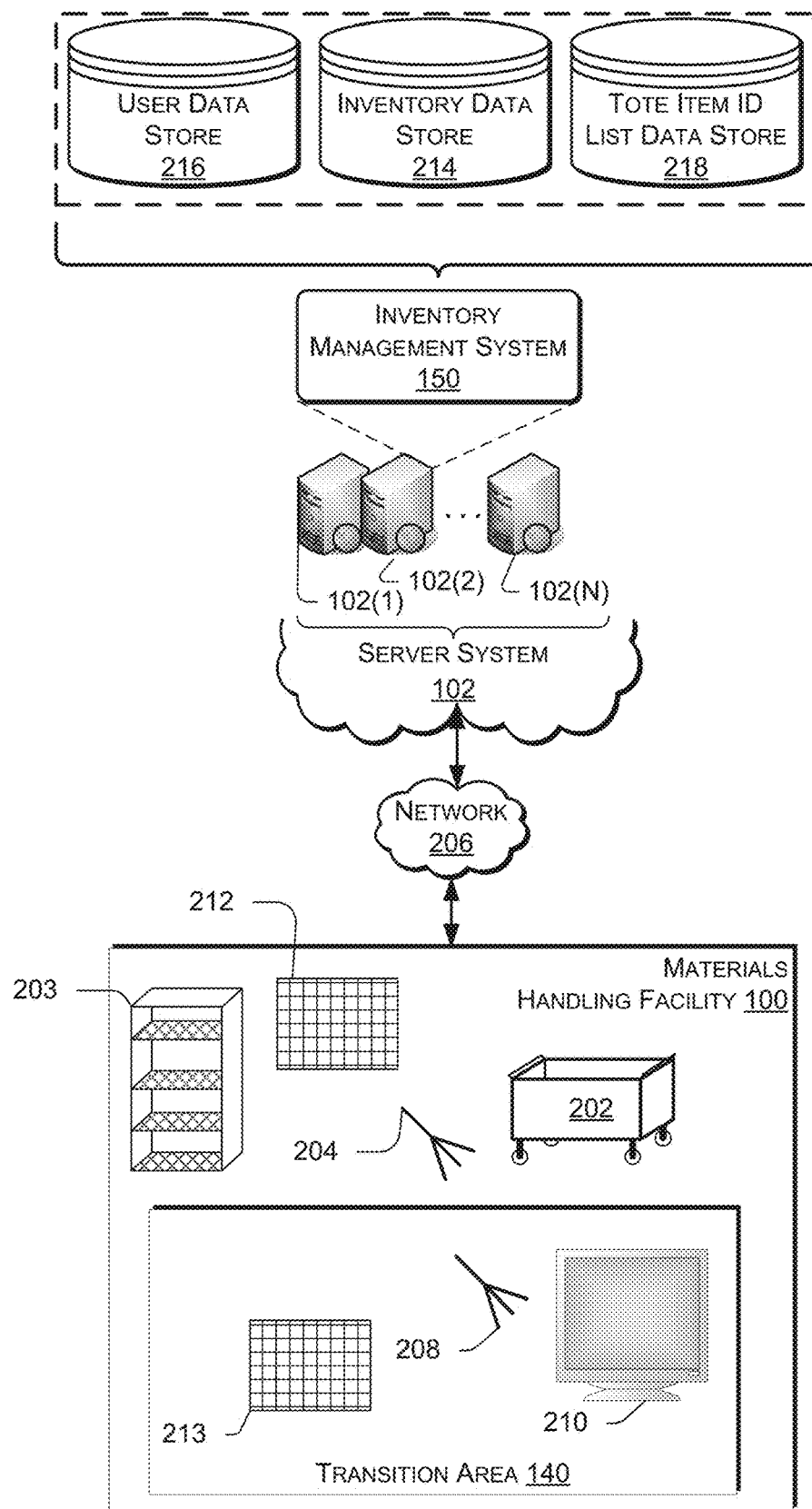
FIG. 2 is a block diagram illustrating additional details of a materials handling facility, according to some implementations.

To further illustrate, FIG. 2 is a block diagram of additional details of a materials handling facility 100, according to some implementations. A materials handling facility agent, customer, or other individual may utilize a tote 202 to progress through a materials handling facility 100 and pick items 135 from storage areas 130. Different surface areas, such as base surface 212, inventory location 203, and transition area surface 213, may include one or more sensors for detecting user patterns, contacts with the surface, item weight, etc. The sensors may be, for example, load cells, interpolating force-sensitive resistance ("IFSR") sensors, etc.

When a user and any companions with the user arrive at the materials handling facility 100 and optionally select a tote, a user pattern is established and a total weight determined. The sensors may be calibrated so that the total weight associated with the user pattern can be comparatively measured at different areas within the materials handling facility. For example, the sensors at the location where the user arrives at the materials handling facility and the sensors at each transition point may be calibrated so that the total weight associated with the user pattern is consistently measured. In some implementations, when the user arrives and/or proceeds through a transition area, the user and any companions may momentarily remain stationary so a total weight can be determined without the need to factor out measured weight resulting from the movement of the user and/or companion.

As items 135 are picked or placed at inventory locations 203, the change in weight at the inventory location and change in the total weight associated with the user pattern corresponding to the user that picked/placed the item may be determined. In some implementations, the item may include an identifier, such as an active identifier (e.g., radio frequency identifier ("RFID")) or visual identifier (e.g., barcode, QR code, unique number, shape, etc.). Item identifier readers may be positioned throughout the materials handling facility, such as on or in the inventory locations, overhead etc. and configured to detect the item identifiers of items as they are placed and/or removed from inventory locations. Generally, the item identifier reader may utilize one or more wireless technologies (e.g., RFID, near field communication ("NFC"), Bluetooth, infrared) and/or visual technologies (e.g., camera, image processing, object recognition, stereoscopic imagery) to detect items and/or item identifiers.

In other implementations, the location of each inventory item may be known and when the item action of item removal is detected, the location of the item action is determined and the item associated with that location identified. In addition, or as an alternative, the weight, size and/or shape of the item as detected by the sensors may be used to identify the item.

When an item is identified, the inventory management system may associate an item identifier representative of the item with an item identifier list corresponding to the user pattern that removed and/or placed the item at the inventory location. This item identifier list may be maintained in a memory located on the tote 202 or maintained by the inventory management system 150, such as in the item identifier list data store 218.

In some instances the tote 202 may operate in conjunction with or may otherwise utilize or communicate with one or more components of the inventory management system 150. The tote 202 may include sensors, such as load cells or IFSR sensors, and detect increases and/or decreases in weight within the tote. For example, when a user removes an item from an inventory location and places the item in the tote 202, the tote may detect the increase in weight and communicate that information to the inventory management system 150. Likewise, components of the inventory management system 150 may interact and communicate with the tote 202 as well as identify user patterns, positions of user patterns and/or communicate with other components of the materials handling facility 100.

Generally, the inventory management system 150 may include one or more communication devices, such as wireless antennas 204, that facilitate wireless communication (e.g., Wi-Fi, NFC, Bluetooth) between the inventory management system 150, the tote 202, sensors and/or a user. The inventory management system 150 may also include one or more server systems 102 that may be local to the materials handling facility 100, remote from the materials handling facility 100, or any combination thereof.

The inventory management system 150 may utilize antennas 204 within the materials handling facility 100 to create a local wireless network (e.g., Wi-Fi) so that the tote 202 and/or the sensors 203, 212, 213 can connect to and communicate with the inventory management system 150. Likewise, in instances when one or more of the components of the inventory management system 150 are remote from the materials handling facility 100, they may communicate with other components of the inventory management system 150 via a network 206.

In some implementations, the user may be identified and/or identify themself when they arrive at the materials handling facility 100. For example, the user may provide a user identifier or other identifying information to identify themself. Alternatively, or in addition thereto, one or more images may be captured of the user and processed for facial recognition to identify the user. In still other implementations, one or more biometric (e.g., fingerprint, eye scan) may be received for use in identifying the user.

Once identified, a user pattern may be established for the user and associated with the user and/or the user's portable device. The user pattern may include an identification of the size and shape of contacts between objects (e.g., user(s), companion(s) with the user, item(s), tote(s)) associated with the user pattern, etc. The total weight associated with the user pattern may include the weight of the user, the tote, picked items, and/or any companions with the user. The tote 202 may also be associated with the user pattern. The user pattern may also include and/or be associated with an item identifier list that is updated each time a user and/or companion with the user removes an item from an inventory location (item identifier list is updated to include the item identifier) or places an item at an inventory location (item identifier list is updated to remove the item identifier).

When the user enters a transition area 140 or progresses through a transition area 140, the items associated with the user pattern may be transitioned from the materials handling facility to the user, transitioned from the materials handling facility to a carrier, transitioned from one location (e.g., storage) within the materials handling facility 100 to another location (e.g., packing) within the materials handling facility 100, etc.

After transition, when the user leaves the tote 202, such as at the end of a work day, the association between the tote 202 and the user may be removed so that the tote 202 can be associated with another user when he/she arrives at the materials handling facility 100.

In some implementations, the transition area 140 may also have other input/output components that are used to assist in verifying the items associated with the user pattern. For example, the transition area 140 may include sensors 213 on or in the base surface that are used to determine an actual total weight of objects associated with the user pattern. The total weight may then be compared to an expected total weight to determine if the items identified in the item identifier list are actually in possession of the user and/or companions with the user. For example, the inventory management system 150 may have determined a total weight associated with the user pattern when the user arrived at the materials handling facility 100 and was identified. The inventory management system 150 may also maintain weight information for items in an inventory data store 214. Utilizing this information and the item identifier list, the inventory management system 150 can compute an expected total weight of objects associated with user pattern. The expected total weight may be compared to an actual total weight determined by the sensors 213. If the difference is beyond a threshold (plus or minus), it may be determined that the items actually in the possession of the user and/or companions with the user do not match those identified in the item identifier list.

In still another example, the transition area 140 may also include one or more imaging components (not shown) that capture images of the user, tote and/or items. The images may be analyzed by the inventory management system 150 and compared to images maintained in the inventory data store 214 to assist in determining if the items actually in the user's possession correspond with those items identified in the item identifier list. In the event the user and/or a companion have consumed one or more of the items, it will not be identified in the images but will be identified in the total weight of objects associated with the user pattern.

It will be appreciated that any number of analysis techniques may be utilized to assist in confirming that the items included in the user's possession correspond to those identified in an item identifier list, and the ones illustrated herein are provided only as examples.

Generally, the inventory management system 150 may include any number and combination of input components, output components and server system 102. The input components may include an imaging device, microphones, sensors 203, 212, 213, antennas 204, 208, or any other component that is capable of receiving input about its surrounding environment. The output components may include projectors, displays 210, antennas 204, 208, speakers and/or any other component that is capable of providing output to its surrounding environment. The input and/or output components may be used separately and/or in conjunction with the sensors. For example, the input and/or output components may be used to determine if the user needs assistance. To illustrate, if the contacts associated with a user pattern change such that it appears the user has fallen, a camera (input component) may be utilized to provide visual verification that the user has fallen, a speaker (output component) may be used to audibly ask the user if assistance is needed and/or a microphone (input component) may be used to receive audible sound from the user. Likewise, if the user has a companion with them and they get separated, the user pattern may maintain information on the contacts associated with both the user and the companion and the input/output components can be used to provide assistance to help the user and/or the companion locate one another.

The inventory management system 150 may also include a server system 102. The server system 102 may be local to the materials handling facility 150, remote from the materials handling facility, or any combination thereof. Likewise, the server system 102 may be configured to communicate over a network 206 with the input components, output components and/or directly with the user.

As illustrated, the server system 102 may be remote from the materials handling facility and implemented as one or more servers 102(1), 102(2), . . . , 102(N) and may, in some instances form a portion of a network-accessible computing platform implemented as a computing infrastructure of processors, storage, software, data access, and so forth that is maintained and accessible by components/devices of the inventory management system 150 via a network 206 such as the Internet. The server system 102 does not require end-user knowledge of the physical location and configuration of the system that delivers the services. Common expressions associated with these remote server system 102 include "on-demand computing," "software as a service (SaaS)," "platform computing," "network-accessible platform," "cloud services," "data centers," and so forth.

The network 206 may utilize wired technologies (e.g., wires. USB, fiber optic cable, etc.), wireless technologies (e.g., RF, IR, NFC, cellular, satellite, Bluetooth, etc.), or other connection technologies. The network 206 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The server system 102 may also include an inventory data store 214, a user data store 216, and an item identifier data store 218. The data stores may include lists, arrays, databases, and other data structures used to provide storage and retrieval of data. Likewise, while the disclosure describes multiple data stores, in some implementations, the data stores may be configured as a single data store or multiple data stores.

The inventory data store 214 maintains information about items 135 stored in the storage areas 130 of the materials handling facility 100. For example, the inventory data store 214 may store for each item, the item weight, dimensions, color, expiration date, volume, manufacturer, identifier (e.g., universal product identifier), quantity of items in the storage area, description of the item, etc.

The user data store 216 includes information about users, such as materials handling facility employees, customers, companions, etc. Any type of information may be stored in the user data store 216. For example, user profile information, such as attributes, name, address, gender, weight, purchase history, social networks and/or friends with which the user interacts, past user patterns associated with the user, determined step distances, cadence, gait and the like may be stored in the user profile data store 216. User profile information may be provided directly by users, such as when they become employed, collected from users when interacting with the inventory management system 150, etc.

The item identifier list data store 218 may include item identifier lists associated with user patterns within the materials handling facility 100. Likewise, the item identifier list data store 218 may include information about each user pattern, such as a unique identifier, the total weight associated with the user pattern, size/shape of contacts included in the user pattern, tote identifier for the tote associated with the user pattern, companions of the user, etc.

The inventory data store 214, user data store 216, and item information list data store 218 may be integrated with the server system 102 or otherwise communicatively coupled with the server system 102. For example, one or more of the inventory data store 214, user data store 216, and item identifier list data store 218 may be located at a remote computing resource (not shown) and communicatively coupled with the server system 102. In some implementations, the inventory data store 214, user data store 216, and item identifier list data store 218 may include one or more CD-RW/DVD-RW drives, hard disk drives, solid-state drives, tape drives, or other storage devices that are utilized to store digital content and information. The server system 102, separately or together with the inventory data store 214, user data store 216 and item identifier list data store 218 may provide an inventory management system 150.

The organization and operation of the materials handling facility 100 described above is given as an example. In other implementations, a materials handling facility 100 may be arranged differently and operate differently than described above. For example, some implementations of materials handling facility 100 may not have a dedicated receiving area 120. In such implementations, received items may be placed directly into the storage area 130. In general, the materials handling facility 1X) may employ any organization and operational flow for handling inventory.

Figure 3:
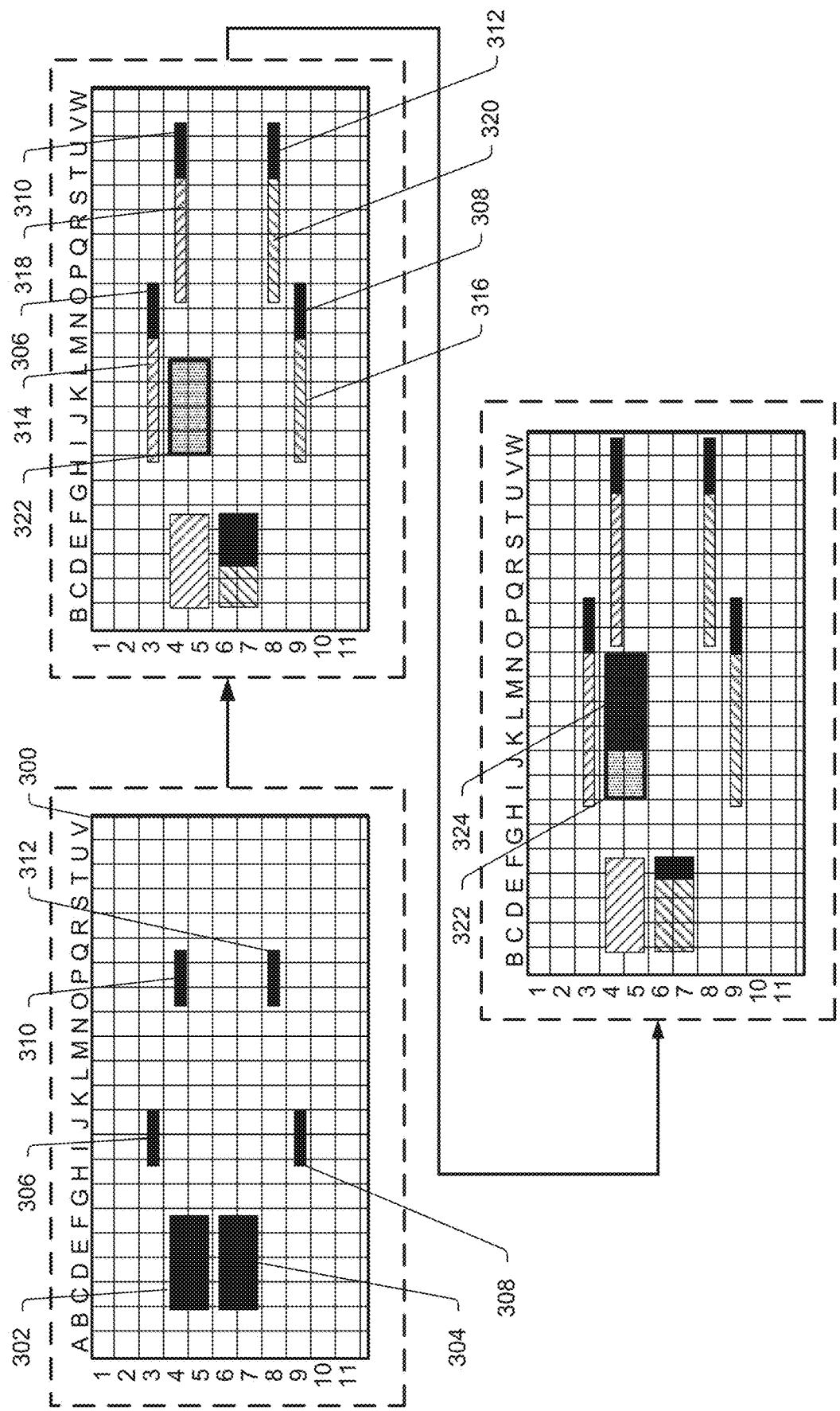
FIG. 3 is a block diagram illustrating the tracking of a location associated with a user pattern, according to some implementations.

FIG. 3 is a block diagram illustrating the tracking of contacts and/or objects associated with a user pattern, according to some implementations. The base surface 300 may include a plurality of sensors, represented as a grid pattern with columns labeled A-V and rows labeled 1-11. When the user is identified, such as when they arrive at the materials handling facility, one or more contacts 302, 304 between the user and a base surface are determined for the user. In this example, the user is standing on two feet. Accordingly, the sensors on the base surface 300 in contact with the user's feet identify two contacts 302, 304, one for each foot, that are associated with the user pattern established for the user. As illustrated, the sensors may be of a size that each contact covers multiple sensors. For example, the contact 302 covers all or a portion of sensors B4, B5, C4, C5, D4, D5, E4, E5, F4, F5. In such an example, each sensor may receive an input, such as weight, and report the input to the inventory management system. The inventory management system, in turn may identify adjacent sensors to determine contacts between the user and the base surface.

In determining the contacts, a size, shape and/or weight of each contact may also be determined and associated with the user pattern. In addition, if the user selects a tote, the contacts between the tote and the base surface, in this example the four wheel contacts 306, 308, 310, 312, are determined and associated with the user pattern. In addition, the size, shape and/or weight of each contact of the tote may also be determined and included in the user pattern. Likewise, if the user has any companions (e.g., friends, children, spouse, caretaker, guardian, parent, pet (non-human animal)) with them, the contacts and corresponding size, shape and/or weight may be determined and associated with the user pattern. The sum of the weight reported from all sensors covering the user pattern may be computed as the total weight for objects associated with the user pattern.

In some implementations, the contacts associated with the user pattern may change. For example, if the user selects a tote that is carried, the tote will typically not have any contacts associated with the user pattern. However, if the tote is set down (e.g., on the base surface) the contacts of the tote are detected and become associated with the user pattern. In detecting the contacts of the tote, the weight of the tote may be determined and the decrease in the total weight associated with the user pattern may be determined (resulting from the user setting down the tote). If the tote weight matches the magnitude of the decrease in the total weight associated with the user pattern, the contacts of the tote are associated with the user pattern and the total weight associated with the user pattern remains the same. Likewise, when the user picks up the tote, even though the contacts from the tote are no longer present, the total weight of the user pattern remains unchanged because the user is again carrying the tote.

As another example, if a companion of the user arrives after the user has entered the materials handling facility, the companion may be identified and associated with the user pattern. For example, when the companion arrives, the companion may identify themself as a companion of a user and the inventory management system 150 may associate that companion with the user pattern. In other implementations, the companion may be monitored by the inventory management system 150 separately until the user acknowledges the companion as being associated with the user. Regardless, of how the companion is associated with the user pattern, once associated, the contacts between the companion and the base surface are associated with the user pattern and the total weight associated with the user pattern is adjusted to include the weight of the companion.

As the objects (e.g., user, companion(s), tote) associated with the user pattern move, the sensors of the base surface 300 detect the movement as changes in weight at the different sensors. For example, the wheels of the tote 202 progress forward in a rolling fashion, shifting the weight forward onto different sensors of the base surface 300, but not separating from the surface. A contact history 314, 316, 318, 320 showing where contacts previously existed may be maintained by the inventory management system 150 for the user pattern. In addition, the contact history may also identify the time the user spends at particular locations within the materials handling facility (generally referred to herein as dwell time). For example, if the user progresses through the materials handling facility and stops at a particular inventory location, the inventory management system may identify the inventory location and determine how long the user remains, or dwells, at the inventory location. Dwell time at different locations may be maintained for each user within the materials handling facility and aggregated to identify areas in the materials handling facility that are most frequently visited, areas with the longest dwell times, high traffic areas, congested areas, etc.

As the user walks, one of the contacts, in this example the first contact 302, will separate from the floor and the weight and shape of the second contact 304 will change, but the total weight associated with the user pattern will remain relatively constant. For example, the weight at the second contact 304 may increase in an amount equal to the magnitude of the decrease in weight of the first contact 302 and the shape of the contact may change as the heel of the user's shoe separates from the base surface. More likely, some of the weight decreasing from the first contact 302 separating from the base surface will be distributed between the second contact 304 and the contacts 306, 308, 310, 312 of the tote 202.

In some implementations, a step distance, gait and/or cadence may be estimated for the user and an estimated next contact location 322 may be determined. For example, an estimated step distance for a user may be determined based on the size and/or weight of the user and/or based on other information known about the user (e.g., height, age, gender, past step distances). Utilizing the estimated step distance and/or based on the direction of movement detected by the contacts, the estimated next contact location 322 is determined.

Finally, when another contact 324 is received on the base surface 300, the size, shape and/or weight of that contact may be determined and utilized to confirm that the contact is to be associated with the user pattern. In some implementations, additional weight may be registered at the time of contact resulting from the momentum of the user. This additional weight may be measured (e.g., $p=m*v$, where p: momentum; m: mass; v: velocity) and/or approximated based on the user profile and removed from the determination of the total weight associated with the user pattern. For example, if a cadence for a user is known and a total weight associated with the user profile is known, the increase in measured weight resulting from the momentum of the user can be approximated and removed from consideration when determining if a contact corresponds with the user profile.

Continuing with the above example, if the size and shape of the contact 324 matches that associated with the user pattern, an initial determination may be made that the contact is to be associated with the user pattern. In addition, an increase in weight measured by the sensors for the contact 324 may be compared to a magnitude of the decrease in weight measured by the other sensors of the user pattern. If the differences between the increase and decrease of weight across the contacts are approximately the same, it may be confirmed that the contact is to be associated with the user pattern. Once the contact is confirmed to correspond with the user pattern, the position of the user and correspondingly the user pattern may be updated.

In some implementations, the estimated next contact location 322 and the actual next contact location 324 may be compared. If the two locations do not match, the step distance of the user may be updated based on the actual step distance between the historical contact location 302 and the actual contact location 324. This may be done on a recurring basis and one or more step distances may be established for the user. In some implementations, the user profile may include multiple step distances, gaits and/or cadences based on past interactions with the user. For example, a user may have a different step distance based on the cadence at which they are walking and/or based on the shoes they are wearing, which may be detectable based on the shape of the contact. Likewise, the gait of the user may change depending on cadence and/or the shoes they are wearing.

In some implementations, if the contacts associated with the user pattern change and/or the weight associated with the contacts change, such information may be used to determine if assistance should be provided to the user. For example, if the contacts associated with a user pattern change from two contacts (user's feet) to one large contact, it may be determined that the user has fallen and potentially needs assistance. Likewise, if the user removes an item from an inventory location and then a contact with the base surface appears that matches the weight and/or shape of the item, it may be determined that the user dropped the item. If the item was glass and/or liquid, the shape of the contact may not match the item but may provide information identifying a spill or dangerous area and that assistance may be needed to clean up the dropped item.

In still other examples, if the contacts of the user are facing an inventory location and alter in size (e.g., the user is standing on their toes) it may be determined that the user needs assistance in reaching an item on a high shelf. Other information about the user and/or other inputs may be utilized to determine if assistance is needed. For example, if the user is standing on their toes and the inventory management system 150 has information about the height of the user, the maximum reach of the user may be determined and utilized to assess whether the user needs assistance in reaching an item at an inventory location.

In still another example, if the user is older and weight from the user's contacts begin to transition to the contacts of the tote (the user is leaning on the tote) it may be determined that the user needs to rest. In such an example, the inventory management system 150 may provide assistance by guiding the user to a bench, chair or other rest area.

Figure 4:
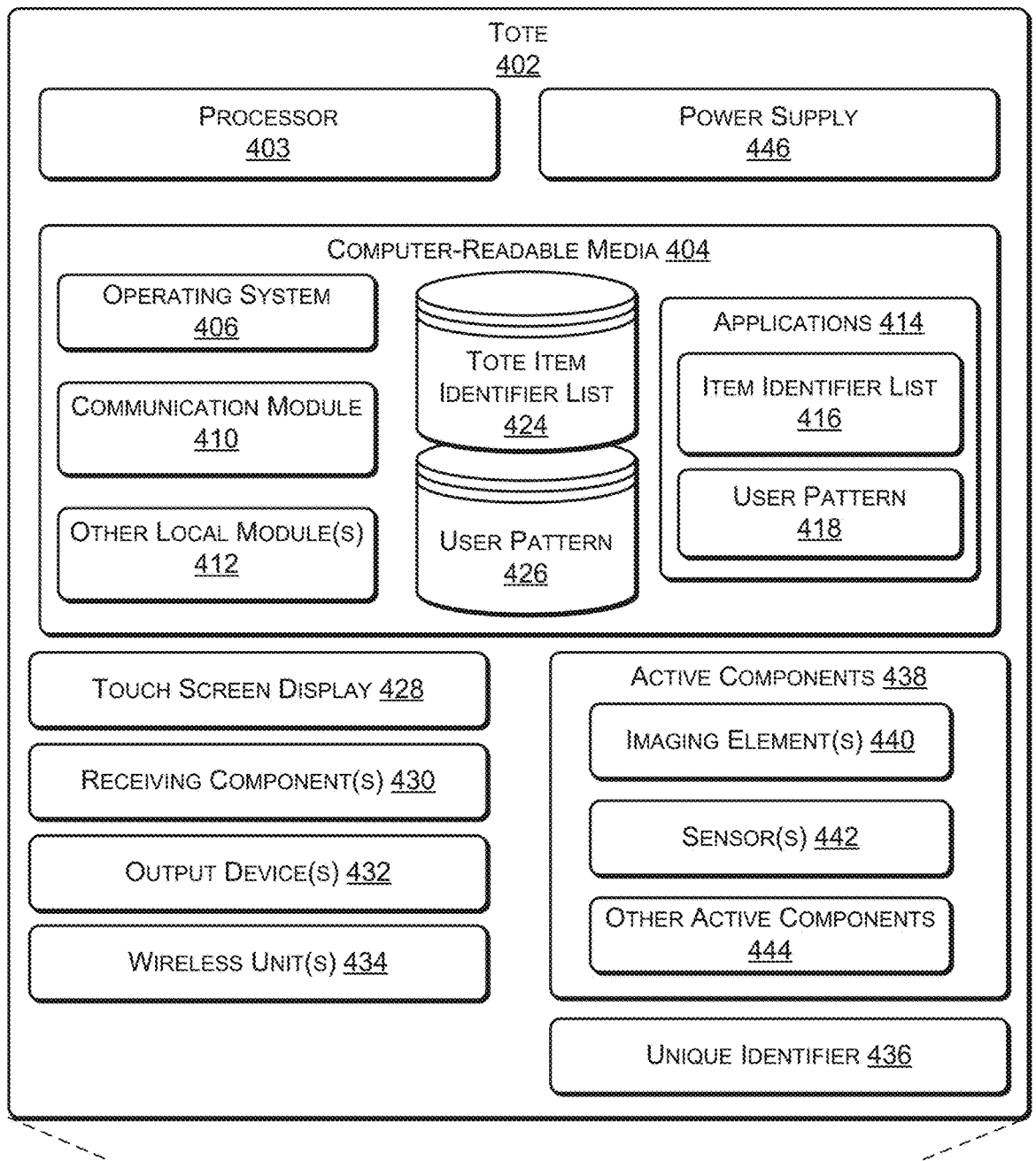
FIG. 4 is a block diagram of a tote, according to some implementations.

While the above examples discuss the use of an inventory management system 150 for establishing user patterns, estimating step distances and maintaining an item identification, in other implementations, such information and computing may be performed locally on the tote 202 associated with the user pattern. For example, FIG. 4 illustrates example functional components of a tote 402, according to some implementations. The functional components of the tote 402 include one or more processors 403 and computer-readable media 404. The computer-readable media 404 may include volatile and nonvolatile memory, removable and non-removable media implemented in any method or technology for storage of information, such as computer-readable instructions, data structures, program modules, item information lists, user profiles, user patterns, or other data. Such memory includes, but is not limited to, RAM, ROM, EEPROM, flash memory or other memory technology. The computer-readable media 404 may be implemented as computer-readable storage media ("CRSM"), which may be any available physical media accessible by the processor(s) 403 to execute instructions stored on the media 404. In one basic implementation, CRSM may include random access memory ("RAM") and Flash memory. In other implementations. CRSM may include, but is not limited to, read-only memory ("ROM"), electrically erasable programmable read-only memory ("EEPROM"), or any other tangible medium which can be used to store the desired information and which can be accessed by the processor(s) 403.

Several modules such as instruction, data stores, and so forth may be stored within the computer-readable media 404 and configured to execute on the processor(s) 403. A few example functional modules are shown stored in the computer-readable media 404, although the same functionality may alternatively be implemented in hardware, firmware, or as a system on a chip (SOC).

An operating system module 406 may be configured to manage hardware and services within and coupled to the tote 402 for the benefit of other modules. A communication module 410 facilitates communication, such as cellular communication, RF communication, Wi-Fi communication, Bluetooth communication, NFC, satellite-based communication, and so forth. For example, the communication module 410 may facilitate communication with the inventory management system 150 via the network 206 or over another wireless communication path and/or may facilitate communication with the sensors via the network 206 or over another wireless communication path. Likewise, the communication module 410 may facilitate communication and detection of item identifiers. Other local modules 412 may also be present on the tote 402, depending upon the implementation and configuration of the tote 402.

The tote 402 may also include a plurality of applications 414 stored in the computer-readable media 404 or otherwise accessible to the tote 402. In this implementation, the applications 414 include an item identifier list application 416 and user pattern application 418. However, the tote 402 may include any number or type of applications and is not limited to the specific example shown here. The item identifier list 416 application may facilitate identification and/or tracking of item identifiers as they are picked by the user, placed into the tote, or removed from the tote and placed by the user at an inventory location. The user pattern 418 application may maintain information about the user pattern, such as the total weight, contact information, etc. Data stores may also be stored locally on the media 404, including an item identifier list data store 424 and one or more user patterns 426. The item identifier list data store 424 may include a list of item identifiers that have been detected as associated with the user pattern. The user pattern data store 426 may include user identifier(s), step distances, contact information (e.g., size, shape), total weight associated with the user pattern, and other information associated with a user pattern.

The tote 402 may also include a display, such as a touch screen display 428, as well as other input devices, like a keypad, control buttons, microphones, motion detection components, etc. Output devices 432 may include a display, an illumination element (e.g., LED), a vibrator to create haptic sensations, microphone(s) or the like. Likewise, the tote 402 might include a wireless unit 434 coupled to another antenna to facilitate a wireless connection to one or more networks, such as the network 206 and/or the sensors. The wireless unit 434 may implement one or more of various wireless technologies, such as Wi-Fi, Bluetooth, RF, NFC, and the like.

The tote 402 may also include an embedded unique identifier 436. The unique identifier may be embedded into a memory 404 of the tote 402 or otherwise stored and accessible by the tote 402.

The tote 402 may also be equipped with multiple active components 438. Any number of components may be used. Representative components include imaging elements 440, sensors 442 and other active components 444. For example, the sensors 442 may be load sensors, IFSR sensors, etc. that are used to detect increases and/or decreases in weight as items are added to and/or removed from the tote. The tote 402 may also include some form of power supply 446, such as a battery, solar power, or other form of power supply for providing power to the tote 402 and its components during operation. In some implementations, rather than using sensors included in the base surface for detecting increases in weight of the user pattern, the tote 402 may include one or more weight sensors that detect an increase and/or decrease in weight as items are added or removed from the tote 402. In other implementations, sensors may be utilized in both the base surface and the tote.

While the functional components of the example tote 402 are discussed herein as part of the tote 402, in other implementations, one or more of the functional components may be distributed throughout the materials handling facility 100 and/or implemented as part of the inventory management system 150. For example, one or more of the applications, such as the item identifier application 416, may be implemented as part of the inventory management system 150. Likewise, the item identifier list 424 may be maintained in the computer-readable media 404 of the tote 402 and/or in the item identifier list data store 218 of the inventory management system 150.

Figure 5:
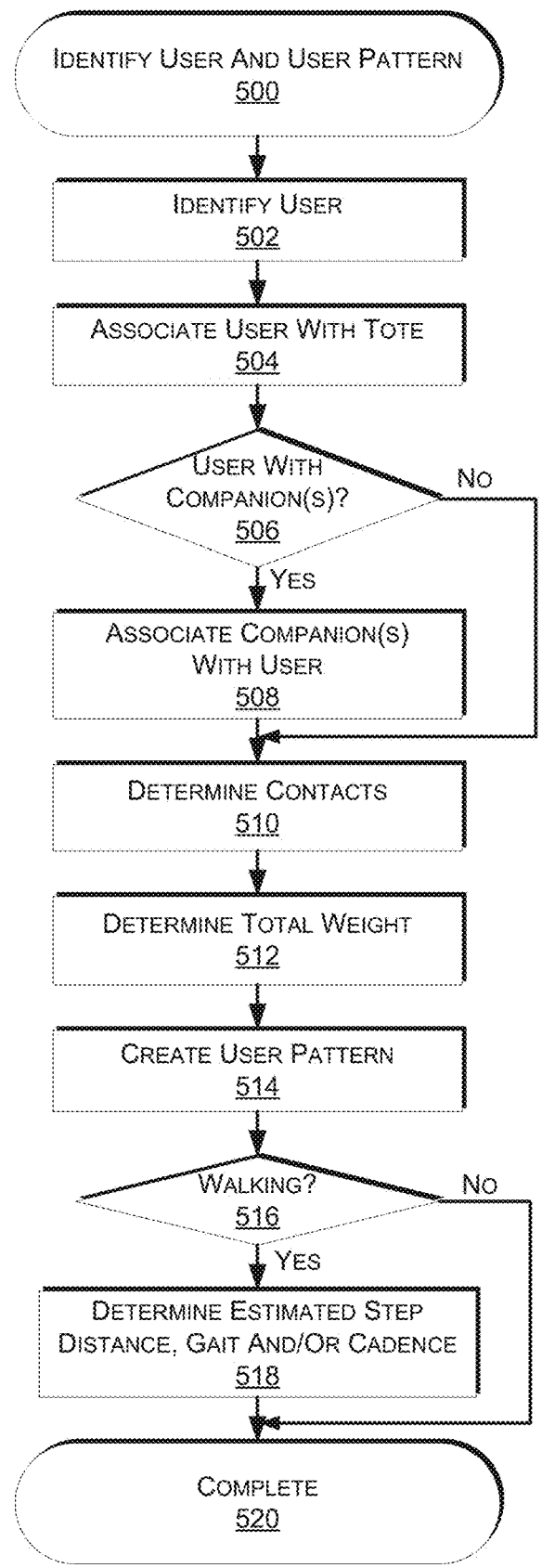
FIG. 5 depicts a flow diagram of a process for identifying a user and creating a user pattern, according to some implementations.

FIG. 5 depicts a flow diagram of an example process 500 for identifying a user and establishing a user pattern, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by identifying a user, as in 502. As discussed above, any number of techniques may be used to identify a user. For example, the user may provide a user identifier, one or more images of the user may be captured and processed to identify the user, biometrics may be used to identify the user and the like. In addition to identifying the user, if the user selects a tote, the tote is associated with the user, as in 504. For example, a unique identifier of the tote may be determined and associated with the user. In addition to identifying the user and optionally a tote, a determination is made as to whether any companions (e.g., friends, children, caretaker, guardian, parents, pets) are with the user, as in 506. If it is determined that one or more companions are with the user, those companions are associated with the user, as in 508. As discussed above, companions may arrive at the materials handling facility either with the user and/or at a later point in time after the user has arrived but remains in the materials handling facility.

Upon associating the user with the companions or if it is determined that there are no companions with the user, the contacts between the user, tote and any companions, and the base surface are determined, as in 510. Contacts may be determined based on information received from each sensor of a base surface in contact with the user, tote and/or companion(s). Determining contacts may include identifying the size, shape and/or weight for each contact. As discussed above, each sensor may provide information as to the weight registered by the sensor. For example, if the user is standing on two feet, two user contacts are identified based on information received from the sensors of the base surface. In other examples, if the user is sitting (e.g., in a wheel chair), additional contacts may be identified, one for each contact between the user's wheel chair and the base surface. This information may be used by the inventory management system to determine the size and shape of each contact. In addition, the sum of the weight from all sensors may be used to determine the total weight for all objects associated with the user pattern, as in 512.

A user pattern is established that includes the identification of the user, the identification of the cart, information (size, shape) for each contact, total weight, and information for any companions, as in 514. In some implementations, an account, such as a user account, may also be associated with the user pattern. For example, if the materials handling facility is a library, the user's library account may be associated with the user pattern and when the user passes through a transition area any items (e.g., books) they have may be transitioned to the user and associated with the user's account. In another example, if the materials handling facility is a store, the user may have an account associated with the store that provides billing information that is associated with the user profile. When the user passes through the transition area, any items in the user's possession may be transitioned from the materials handling facility to the user and the user's account charged for the items.

In some implementations, multiple accounts may be associated with a user pattern. For example, a user and companions with the user may all agree to share the cost of items included in the item identifier list. In such an example, the user account of the user and the accounts of the companions may all be associated with the user pattern. When the user and/or a companion passes through the transition area, the total cost for items included in the item identifier list may be determined and a portion of the total cost applied to each of the associated user accounts.

Returning to the user pattern generation, a determination may be made as to whether the user and/or any of the companions are walking, as in 516. A user and/or companion may be determined to be walking based on the contacts for that particular user/companion. For example, if the user has two contacts of a rectangular shape, it may be determined that the user is walking. For each user and/or companion that is determined to be walking, a step distance, gait and/or cadence may be determined and associated with the user pattern, as in 518. The step distance, gait and/or cadence may be determined based on the size of the contacts, the weight associated with the contacts, based on past step distances, gaits and/or cadences determined for the user/companion, etc. Upon determining each step distance, gait and/or cadence, or if it is determined that no user or companions are walking, the process completes, as in 520.

Figure 6:
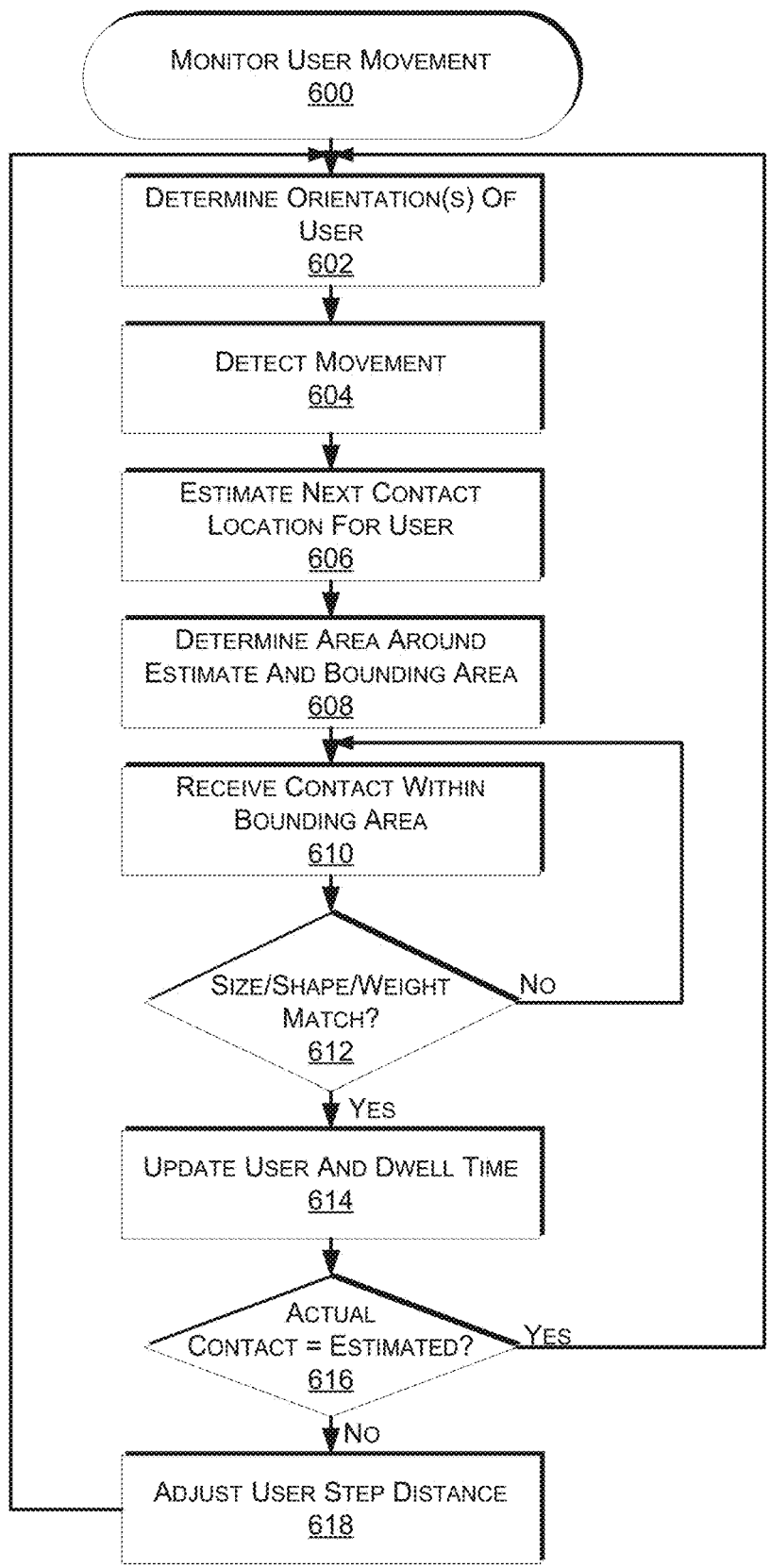
FIG. 6 depicts a flow diagram of a process for monitoring movement of a user associated with a user pattern, according to some implementations.

FIG. 6 depicts a flow diagram of a process 600 for monitoring a user's movement within a materials handling facility, according to some implementations. The example process 600 begins by determining orientation(s) of the contacts associated with the user pattern, as in 602. If the user pattern is only associated with the user and optionally a tote, the orientation will be based on the position of the contacts of the tote and/or the user. In such an implementation, two orientations may be determined for the user pattern; one orientation based on the position of the tote contacts and one orientation based on the position of the user contacts. If companions are also associated with the user pattern, additional orientations may be determined, one for each companion.

The base surface sensors reporting weights for each contact may be monitored for any change in weight. Likewise, surrounding sensors may be monitored to detect change in weight. A change in weight may be representative of a movement, as in 604. Upon detecting a movement, a next surface contact for the user pattern is determined, as in 606. Determining the next surface contact may take into consideration the orientation of the user, companion and/or tote for which the movement is detected, the determined step distance and/or other information. In comparison, if the movement is associated with a wheel or other object that will not separate from the base surface, the next contact will be determined to be one or more adjacent sensors. Based on the estimated location of the next contact, a determined area around the estimated location and a bounding area around the user may be determined, as in 608. The estimated area may be any defined area or extension beyond the estimated contact location. For example, if the estimated contact location covers a 4×6 grid of sensors, the estimated area may be expanded to include a 6×8 grid of sensors. The bounding area around the user may be any defined area within which a contact may move. For example, if only two contacts exist (e.g., the user's feet) it may be determined that the bounding area is a six foot radius around the two contacts. Generally, the bounding area represents the maximum estimates within which a contact associated with the user pattern may be received.

Next, a contact is received within the bounding area, as in 610. The contact may be determined based on an increase of a weight of a sensor within the bounding area. Upon detecting a contact, a determination is made as to whether the size, shape and/or weight of the contact corresponds with a contact associated with the user pattern, as in 612. The size and/or shape may be determined based on a comparison of the arrangement of the sensors reporting weight at the contact and the size/shape of the prior contact associated with the user pattern. The weight may be determined by summing the weight received from the sensors newly reporting weight. That weight may be compared with a magnitude of the decrease in the total weight reported by the sensors of the other contacts associated with the user pattern. The weight of the new contact and the magnitude of the decrease in weight of the existing contacts should be approximately equal, as the total weight of the user pattern has not changed.

If it is determined that the size, shape and/or weight of the contact does not correspond with the user pattern, the contact is discarded and the process 600 returns to block 610 and continues. However, if the contact does correspond with a contact associated with the user pattern, the location of the object (e.g., user, companion) associated with user pattern is updated, as in 614. In addition to updating the location, dwell time at the location may be maintained, identifying how long the user/companion remains at the location within the materials handling facility.

In some implementations, a determination may be made as to whether the actual location of the contact corresponds with the estimated location of the contact, as in 616. If the actual contact location corresponds with the estimated contact location, the process 600 returns to block 602 and repeats. However, if the actual contact location does not correspond to the estimated contact location, the step distance of the user may be adjusted to reflect the actual distance between the prior contact and the actual contact, as in 618.

Figure 7:
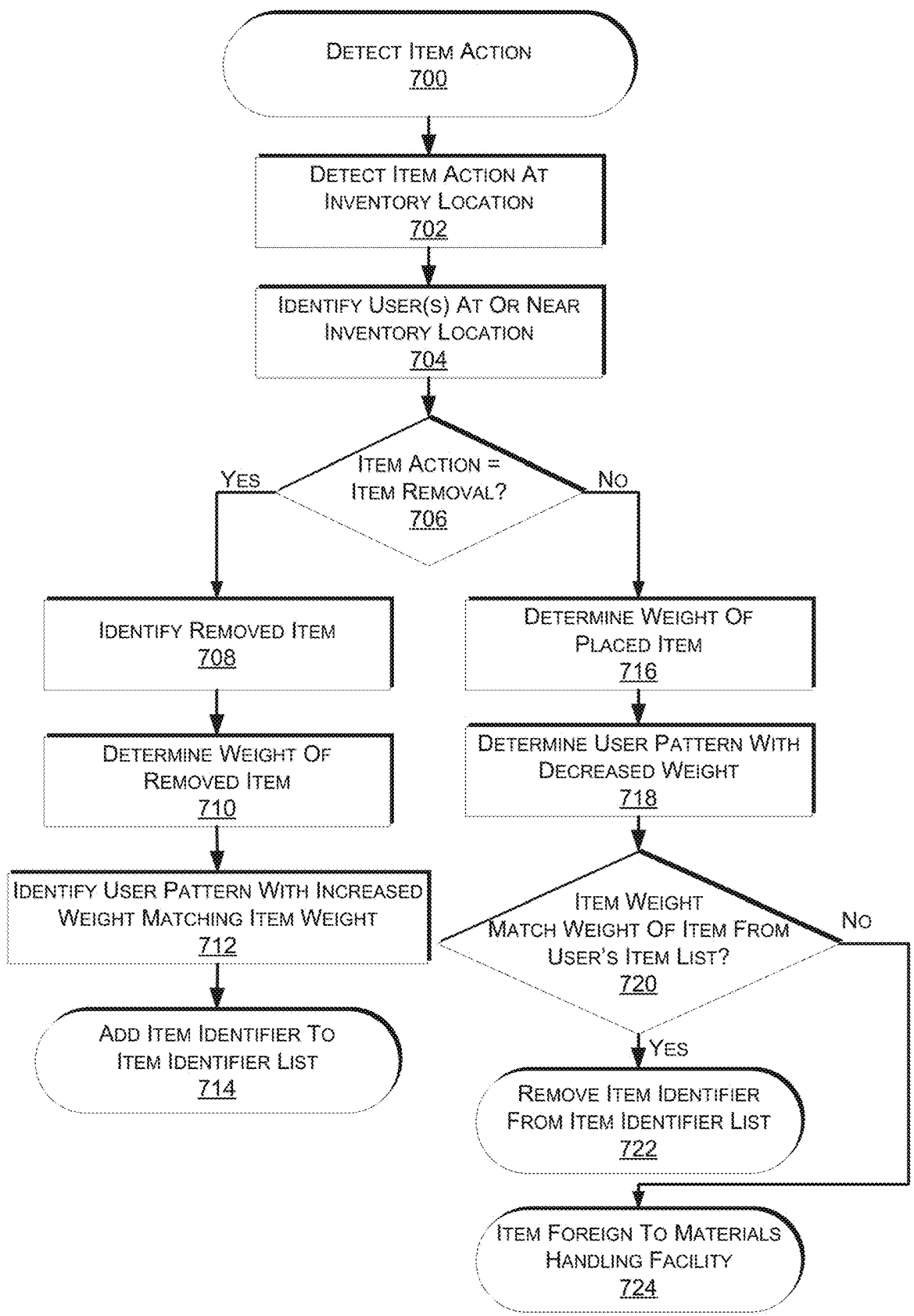
FIG. 7 depicts a flow diagram of a process for associating an item action with a user pattern, according to some implementations.

FIG. 7 depicts a flow diagram of an example process 700 for associating an item action with a user pattern, according to some implementations. The process 700 begins by detecting an item action at an inventory location, as in 702. As discussed above, an item action may be an item placement and/or item removal. Item placement and/or item removal at an inventory location may be determined using a variety of inputs. For example, if the inventory location includes a sensor, such as a weight sensor, pressure sensor, or the like, when an item is removed from the inventory location and/or placed into the inventory location, the change in weight/pressure may be detected.

Upon detecting an item action at an inventory location, users at or near the inventory location are determined, as in 704. As discussed above, input from sensors on the base surface may be utilized to track a user as the user, tote and/or any associated companions move through the materials handling facility. While the examples discussed above correspond to a user pattern in which the contacts are generally close together, in some implementations, the user pattern may be large and/or separated into multiple parts. For example, if the user pattern includes a user, a tote and a companion, at times the user pattern may be separated into three parts, each part representing a different location within the materials handling facility. For example, if the user stops the tote and walks a distance away, the user pattern may be separated into two parts. Likewise, if the companion moves away from the user and the tote, the user pattern may also be separated again to track the contacts of the companion. In such an example, the total weight for the user pattern will still be the sum of all contacts associated with the user pattern, regardless of location of associated objects and/or number of parts that make up the user pattern.

Returning to the example process 700, a determination is made as to whether the item action is an item removal, as in 706. If it is determined that the item action is an item removal, the removed item is identified, as in 708. As discussed above, the removed item may be identified based on, for example, the location of the removed item, the size of the removed item, the weight of the removed item, image recognition, etc. Once identified, the weight of the removed item is determined, as in 710. In implementations in which the inventory location includes a weight sensor, the decrease in weight at the inventory location may be the determined weight for the item. In other implementations, the weight of the item may be obtained from an inventory data store. For some items, a weight may be determined using a certified scale. For example, produce items may initially be weighed by the user on a certified scale and that weight utilized as the weight for the item.

In addition, a user pattern with an associated user/companion at or near the inventory location that experienced an increase in total weight matching the weight of the item is identified, as in 712. As discussed above, if a user removes an item from an inventory location (picks up the item) the total weight associated with the user pattern will increase in an amount equal to the weight of the item.

Upon identifying the user pattern with the matching increase in weight, an item identifier representative of the item removed from the inventory location is included on an item identifier list associated with the identified user pattern, as in 714.

Returning to decision block 706, if it is determined that the item action is not an item removal (it is an item placement), the weight of the placed item is determined, as in 716. Similar to determining the weight of a removed item, the weight of a placed item may be determined based on an increase in weight detected by one or more sensors at the inventory location. In alternative embodiments, the weight of the item may be determined based on an identity of the item.

A user pattern associated with a user and/or companion at or near the inventory location in which the total weight associated with the user pattern decreased by the same or similar amount as the increase in weight at the inventory location is also determined, as in 718. Similar to detecting an increase in total weight, a decrease in total weight can be determined based on a sum of the weight received from the sensors at the contacts associated with the user pattern compared to a prior sum of the sensors.

A determination may also be made as to whether the weight of the placed item matches the weight of an item identified on the item identifier list associated with the determined user pattern, as in 720. If the item weight matches the weight of an item identified on the item identifier list, the item identifier is removed from the item identifier list and the process completes, as in 722. In some implementations, additional processing, such as image analysis of the item may be performed to provide additional confirmation that the placed item corresponds to the item removed from the item identifier list.

However, if it is determined that the weight of the placed item does not correspond with an item identified on the item identifier list, the placed item is identified as foreign to the materials handling facility, as in 724. A foreign item may be any item that was not originally removed from an inventory location while the user was in the materials handling facility. For example, if the user arrives at the materials handling facility drinking a cup of coffee and sets the coffee cup down on an inventory location, the coffee cup may be identified as foreign to the materials handling facility.

In some implementations, additional actions may be performed when a foreign item is detected. For example, an operator may be dispatched to retrieve and/or identify the foreign item, images of the foreign item may be captured and processed to identify the foreign item, the user may be notified that they placed a foreign item at an inventory location, and the like.

Figure 8:
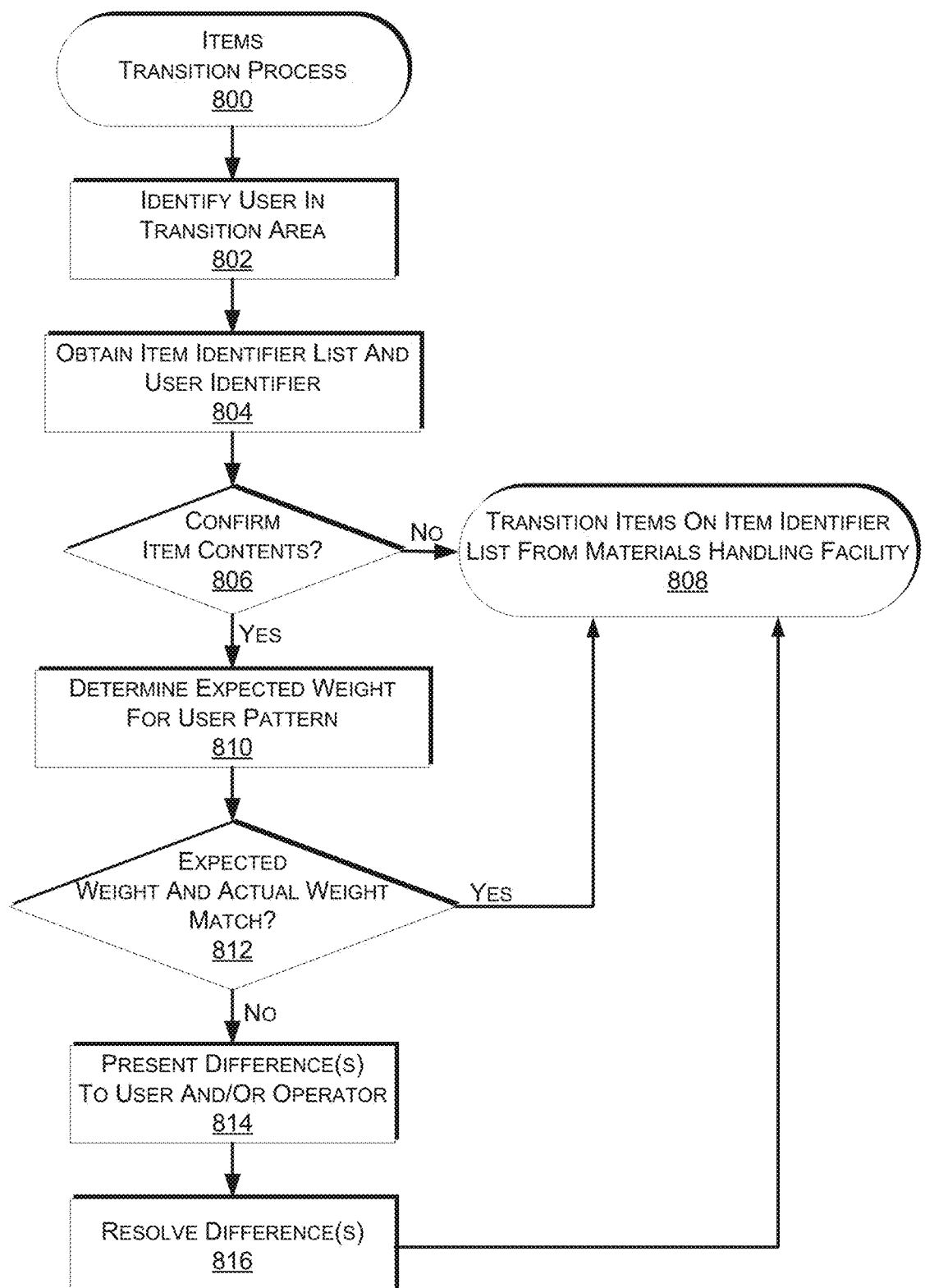
FIG. 8 depicts a flow diagram of a process for transitioning items included in an item identifier list, according to some implementations.

FIG. 8 depicts a flow diagram of an example process 800 for transitioning items included in a user's item list, according to some implementations. The example process 800 begins by identifying a user pattern associated with a user and/or companion located in a transition area, as in 802. As discussed above, the transition area may be any location within or exiting the materials handling facility in which items are to be transferred. For example, a transition area may be a pack station, a ship station, an exit, etc.

For the identified user pattern, the item identifier list and user identifier associated with the user pattern are obtained, as in 804. In implementations where the user pattern is maintained by the inventory management system, this information may be retrieved from one or more data stores of the inventory management system. In implementations where the user pattern is maintained by the tote, the information may be obtained from memory or a data store of the tote. A determination may be made as to whether the items identified on the item identifier list are to be confirmed, as in 806. In some implementations, at each transition, items may be confirmed. In other implementations, confirmation may be dependent on the identified user, the value of the items, and/or other factors. If it is determined that the items are not to be confirmed, the items identified on the item identifier list are transitioned from the materials handling facility, as in 808.

However, if it is determined that the items are to be confirmed, an expected weight of the objects associated with the user pattern may be determined, as in 810. An expected weight may be determined based on the total weight associated with the user pattern as determined when the user pattern was established plus the weight of any items identified on the item identifier list associated with the user pattern. In some implementations, adjustments may be made to the expected weight based on activities of the user while in the materials handling facility. For example, if the user went to the bathroom while in the materials handling facility, a difference between the weight of the user when they entered the bathroom and when the exited the bathroom may be subtracted from the expected weight of the user pattern.

The expected weight may be compared to the actual weight as measured by the one or more sensors at the transition area and a determination made as to whether the expected weight and the actual weight match, as in 812. In some implementations the expected weight and the actual weight must be within a determined degree of tolerance (e.g., plus or minus a percentage). In other implementations, the expected weight and the actual weight must match exactly.

If it is determined that the expected weight and the actual weight match, the items are transitioned from the materials handling facility, as in 808. However, if the expected weight and the actual weight do not match, the differences may be presented to the user and/or an operator, as in 814. The user and/or the operator may then resolve the difference, as in 816. The difference may be resolved, for example, by identifying items that should not be included in the item identifier list and/or identifying items that should be included in the item identifier list.

Figure 9:
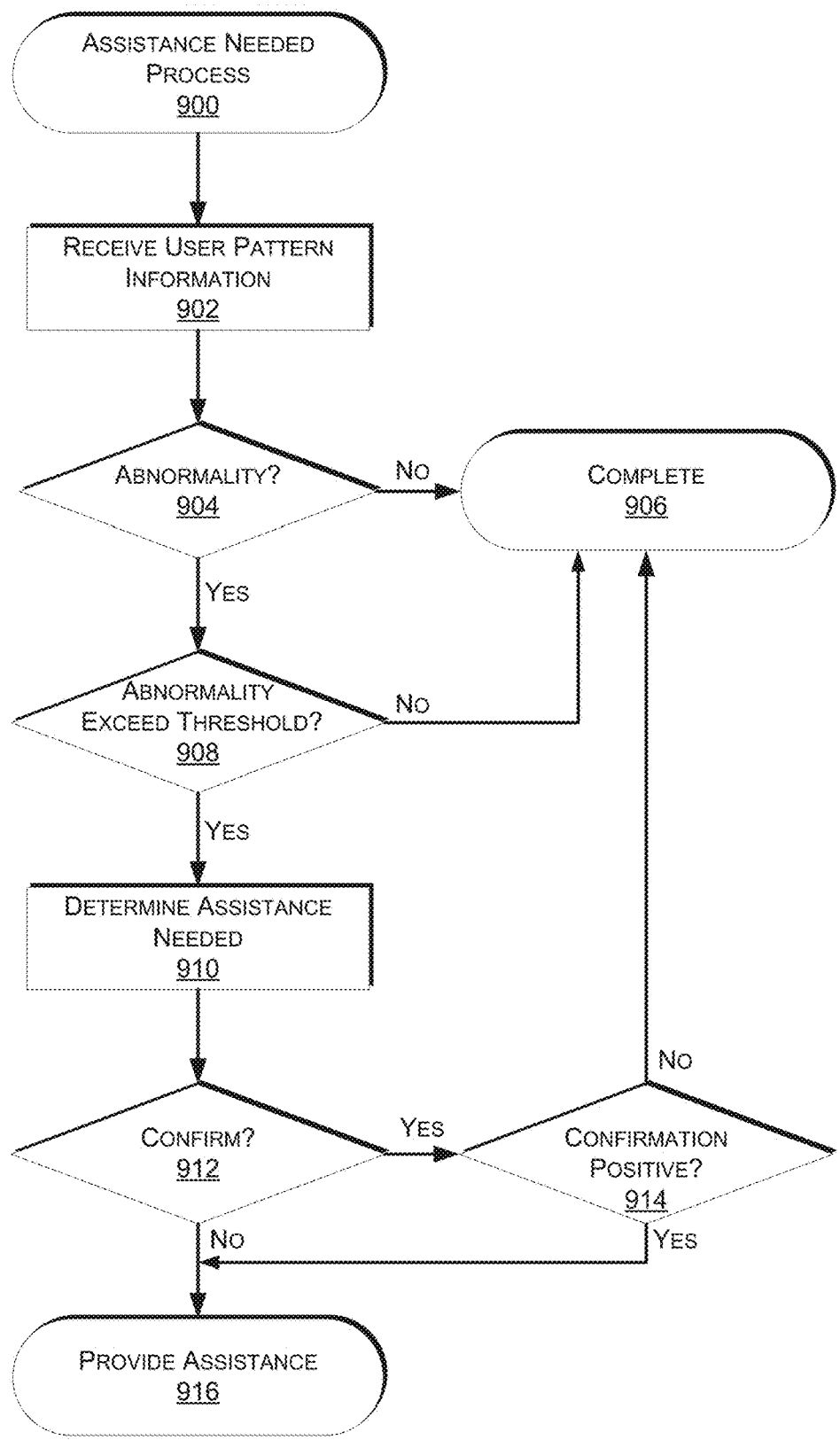
FIG. 9 depicts a flow diagram of a process for determining if a user needs assistance, according to some implementations.

FIG. 9 depicts a flow diagram of a process for determining if a user or companion needs assistance, according to some implementations. The example process 900 may be performed periodically or continuously while the user and/or companions of a user are in the materials handling facility. The example process 900 begins by receiving user pattern information, as in 902. As discussed above, user pattern information may include user profile information, contacts associated with the user pattern, total weight associated with the user pattern, weights for each contact, location(s) of the user and/or companion associated with the user pattern, etc.

Based on the received information, a determination may be made as to whether there are any abnormalities, as in 904. For example, if the user pattern includes information identifying two contact points that are the size and shape of feet and the contact received is a single large contact with a total weight of the user, it may be determined that the user has fallen (abnormality). As another example, if the received contacts show that the user is standing on their toes (e.g., the actual contacts are smaller than the contacts associated with the user profile) an abnormality may be determined. As still another example, if the weight of the user has shifted from the user's contacts to the contacts of a tote, inventory location, or other object, an abnormality may be detected. In some implementations, additional user profile information may be considered to determine if an abnormality is present. Continuing with the weight shift example, if the user profile identifies that the user typically shifts their weight to the tote, it may be determined that no abnormality exists. In comparison, if the user profile identifies the user as a senior or older person that typically does not shift their weight to the tote, an abnormality may be determined.

In another example, if the user is at the materials handling facility with a companion and the two separate beyond a defined distance and/or more than a defined amount of time, an abnormality may be detected. The defined distance and/or time may be determined based on the companion and/or provided by the user. For example, if the companion is a pet, the defined distance may be determined to be any distance beyond the bounding area associated with the user pattern. Likewise, if the companion is a child, the determined distance may be any distance beyond the bounding area associated with the user pattern. Generally, an abnormality may be any change in information associated with the user pattern that is not expected (e.g., weight shift, change in contacts size, shape or number, separation of contacts beyond a defined distance).

If no abnormality is detected, the example process 900 completes, as in 906. However, if an abnormality is detected, a determination is made as to whether the abnormality exceeds a threshold, as in 908. The threshold may be any criteria for determining whether assistance is to be provided. The threshold may be different for different users and/or companions and/or may be different for different areas of the materials handling facility. For example, some users may have a lower threshold in certain areas of the materials handling facility than others. Likewise, some areas of the materials handling facility (e.g., dangerous areas, restricted areas) may have a lower threshold for all users/companions. In still other instances, different abnormalities may have different thresholds. For example, the abnormality of a user falling may have a low threshold so that assistance can be quickly provided. In other examples, an abnormality of a user falling may vary depending on the age of the user and/or whether the user is with a companion.

If it is determined that the abnormality exceeds a threshold, the type of assistance potentially needed is determined, as in 910. The type of assistance potentially needed may be determined based on the detected abnormality. For example, if the user and a companion have become separated, the determined assistance may be providing audible and/or visual guidance to the user and/or companion to guide them back together. If a user has fallen, the potential assistance may be to dispatch medical support. If a user is unable to reach an item on a high shelf, the potential assistance may be to dispatch an operator that can retrieve the item.

In addition to determining the potential assistance needed, a determination may be made as to whether a confirmation is to be obtained prior to providing the assistance, as in 912. Confirmation may be provided by the user, the companion, by an operator or by other means. For example, the inventory management system 150, upon detecting an abnormality that exceeds a threshold, may provide an audible inquiry to the user asking whether assistance is needed. The user may then audibly and/or visibly confirm whether assistance is needed. In another implementation, an operator may view video of the user and confirm whether assistance is needed. In some implementations, confirmation may not be needed for one or more abnormalities. For example, if a user has fallen in a dangerous area of the materials handling facility, confirmation may not be needed and assistance may be immediately provided.

If it is determined that confirmation is to be received, a determination is made as to whether the received confirmation is positive (assistance is needed) or negative (assistance not needed), as in 914. If the confirmation identifies that assistance is not needed, the example process 900 completes, as in 906. However, if it is determined that the confirmation is positive such that assistance is needed, or if it is determined that confirmation is not needed or not received within a defined period of time, the example process provides instructions and/or otherwise causes the determined assistance to be provided, as in 916.

Figure 10:
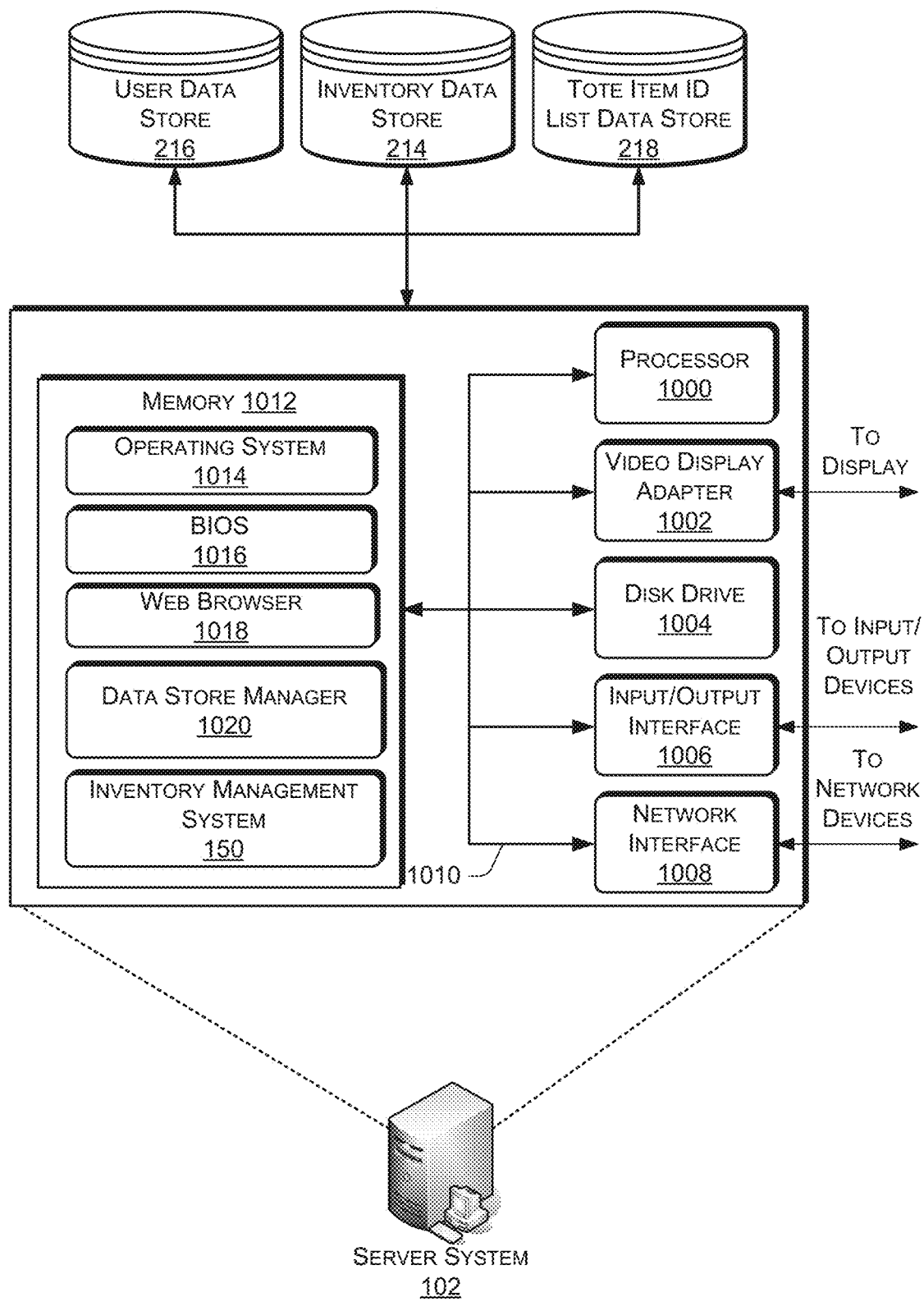
FIG. 10 is a block diagram of an illustrative implementation of a server system that may be used with various implementations.

FIG. 10 is a pictorial diagram of an illustrative implementation of a server system, such as the server system 102, that may be used in the implementations described herein. The server system 102 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the server system 102 to monitor and configure operation of the server system 102. The input/output interface 1006 likewise communicates with external input/output devices not shown in FIG. 10, such as a mouse, keyboard, scanner, or other input and output devices that can be operated by an operator of the server system 102. The network interface 1008 includes hardware, software, or any combination thereof, to communicate with other computing devices. For example, the network interface 1008 may be configured to provide communications between the server system 102 and other computing devices, such as tote, via the network 206, as shown in FIG. 2.

The memory 1012 generally comprises random access memory (RAM), read-only memory (ROM), flash memory, and/or other volatile or permanent memory. The memory 1012 is shown storing an operating system 1014 for controlling the operation of the server system 102. A binary input/output system (BIOS) 1016 for controlling the low-level operation of the server system 102 is also stored in the memory 1012.

The memory 1012 additionally stores program code and data for providing network services to totes, sensors and/or the inventory management system 150. Accordingly, the memory 1012 may store a browser application 1018. The browser application 1018 comprises computer executable instructions, that, when executed by the processor 1000 generate or otherwise obtain configurable markup documents such as Web pages. The browser application 1018 communicates with a data store manager application 1020 to facilitate data exchange between the inventory data store 214, the user data store 216, and/or the item identifier list data store 218.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 214-218 as needed to execute aspects of one or more applications for the tote 202, and/or the inventory management system 150.

The data stores 214-218 can include several separate data tables, databases or other data storage mechanisms and media for storing data relating to a particular aspect. For example, the data stores 214-218 illustrated include mechanisms for inventory information, user information, item identifier lists, tote information, weight information, sensor information, etc. which can be used to generate and deliver information to the inventory management system 150 and/or users.

It should be understood that there can be many other aspects that may be stored in the data stores 214-218. The data stores 214-218 are operable, through logic associated therewith, to receive instructions from the server system 102 and obtain, update or otherwise process data in response thereto.

In addition to maintaining information about inventory, users, and user patterns, the inventory management system 150 may provide use information back to the users. For example, the inventory management system 150, through communication with the server system 102, may provide use information back to a user. Such information may include a list of the items associated with the user pattern, the cost of items associated with the user pattern, items remaining to be picked before progressing to the transition area, the location within the materials handling facility of items to be picked, and the like.

The memory 1012 may also include the inventory management system 150, discussed above. The inventory management system 150 may be executable by the processor 1000 to implement one or more of the functions of the server system 102. In one implementation, the inventory management system 150 may represent instructions embodied in one or more software programs stored in the memory 1012. In another implementation, the inventory management system 150 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that when executed by the one or more processors cause the one or more processors to at least:
detect an item action, wherein the item action includes a placement of a first item at an inventory location;
determine a first item weight of the first item placed at the inventory location;
detect a decrease in a total weight associated with an agent at the inventory location;
determine that a magnitude of the decrease in the total weight is approximately equal to a magnitude of the determined first item weight;
determine if an item identifier of an item identifier list associated with the agent is representative of a second item having a second item weight that is approximately equal to the magnitude of the first item weight or the magnitude of the decrease in the total weight associated with the agent; and
based at least in part on a determination that the second item weight is approximately equal to the magnitude of the first item weight or the magnitude of the decrease in the total weight associated with the agent, remove the item identifier from the item identifier list.

2. The computing system of claim 1, wherein the program instructions that when executed by the one or more processors further cause the one or more processors to at least:
based at least in part on a determination that the second item weight is not approximately equal to the magnitude of the first item weight or the magnitude of the decrease in the total weight associated with the agent, identify the first item as a foreign item; and
initiate an action with respect to the first item.

3. The computing system of claim 2, wherein the action includes at least one of dispatching an operator to identify the first item, processing an image of the first item, or notifying the agent of the first item.

4. The computing system of claim 1, wherein the program instructions that when executed by the one or more processors further cause the one or more processors to at least:
determine the agent positioned at the inventory location based at least in part on one or more of an agent identifier provided by the agent, facial recognition, biometric recognition, a total weight associated with the agent, an active identifier, or a visual identifier.

5. The computing system of claim 1, wherein the program instructions that when executed by the one or more processors to determine the first item weight further include instructions that when executed by the one or more processors further cause the one or more processors to at least:
   detect an increase in an inventory weight at the inventory location; and
   determine, based at least in part on the detected increase in the inventory weight, the first item weight.

6. The computing system of claim 1, wherein the program instructions that when executed by the one or more processors further cause the one or more processors to at least:
   determine an identity of the first item based at least in part on the first item weight, the second item weight, the decrease in the total weight associated with the agent, or the item identifier.

7. The computing system of claim 1, wherein the decrease in the total weight associated with the agent is determined based at least in part by a sensor of a base surface in contact with the agent.

8. A computer-implemented method, comprising:
   detecting an item action, wherein the item action includes a placement of a first item at an inventory location;
   determining a first item weight of the first item placed at the inventory location;
   detecting a decrease in a total weight associated with an agent at or near the inventory location;
   determining that a magnitude of the decrease in the total weight is approximately equal to a magnitude of the determined first item weight;
   determining if an item identifier of an item identifier list associated with the agent is representative of a second item having a second item weight that is approximately equal to the magnitude of the first item weight or the magnitude of the decrease in the total weight associated with the agent; and
   based at least in part on determining that the second item weight is approximately equal to the magnitude of the first item weight or the magnitude of the decrease in the total weight associated with the agent, removing the item identifier from the item identifier list.

9. The computer-implemented method of claim 8, further comprising:
   based at least in part on determining that the second item weight is not approximately equal to the magnitude of the first item weight or the magnitude of the decrease in the total weight associated with the agent, identifying the first item as a foreign item; and
   initiating an action with respect to the first item.

10. The computer-implemented method of claim 9, wherein the action includes at least one of dispatching an operator to identify the first item, processing an image of the first item, or notifying the agent of the first item.

11. The computer-implemented method of claim 8, wherein:
   the total weight associated with the agent includes a total weight of a plurality of items associated with the agent; and
   the item identifier list identifies items associated with the agent.

12. The computer-implemented method of claim 8, wherein determining the first item weight includes:
   detecting an increase in an inventory weight at the inventory location; and
   determining, based at least in part on the detected increase in the inventory weight, the first item weight.

13. The computer-implemented method of claim 8, further comprising:
   determining an identity of the first item based at least in part on the first item weight, the second item weight, the decrease in the total weight associated with the agent, or the item identifier.

14. The computer-implemented method of claim 8, wherein the decrease in the total weight associated with the agent is determined based at least in part by a sensor of a base surface in contact with the agent.

15. A computer-implemented method, comprising:
   under control of one or more computing systems configured with executable instructions,
      receiving, from a first sensor positioned at an inventory location, first sensor information indicating an increase in an inventory weight detected by the first sensor;
      determining, based at least in part on the increase in the inventory weight, an item that was placed at the inventory location;
      receiving, from a second sensor positioned on a base surface, second sensor information, the second sensor information indicating a decrease in a weight detected by the second sensor;
      computing a difference between the increase in the inventory weight indicated in the first sensor information and the decrease in the weight indicated in the second sensor information;
      determining that a magnitude of the increase in the inventory weight detected by the first sensor is approximately equal to a magnitude of the difference; and
      based at least in part on the determination, updating an item identifier list associated with an agent to remove an indication of the item.

16. The computer-implemented method of claim 15, further comprising:
   determining the agent positioned at the second sensor based at least in part on one or more of an agent identifier provided by the agent, facial recognition, biometric recognition, a total weight associated with the agent, an active identifier, or a visual identifier.

17. The computer-implemented method of claim 16, wherein the total weight associated with the agent includes a total weight of a plurality of items associated with the agent.

18. The computer-implemented method of claim 15, wherein the item identifier list identifies items associated with the agent.

19. The computer-implemented method of claim 15, further comprising:
   determining a size and a shape of a contact with the base surface, the contact associated with the agent, wherein the size and shape are determined based at least in part on a plurality of sensors at the base surface.

20. The computer-implemented method of claim 15, further comprising:
   determining a step distance, a gate or a cadence for the agent, wherein the step distance, the gate or the cadence of the agent are determined at least in part on a height of the agent, a size of a contact associated with the agent, a past step distance, a past gate distance, or a past cadence associated with the agent.

* * * * *